United States Patent
Alhorn et al.

(10) Patent No.: US 8,290,435 B1
(45) Date of Patent: Oct. 16, 2012

(54) SHORT-RANGE COMMUNICATION SYSTEM

(75) Inventors: Dean C. Alhorn, Huntsville, AL (US);
David E. Howard, Hazel Green, AL (US); Dennis A. Smith, Athens, AL (US)

(73) Assignee: The United States of America as Represented by the Administrator of the Administrator of the National Aeronautics and Space Administration, Washington, DC (US)

( * ) Notice: Subject to any disclaimer, the term of this patent is extended or adjusted under 35 U.S.C. 154(b) by 1051 days.

(21) Appl. No.: 12/241,322

(22) Filed: Sep. 30, 2008

(51) Int. Cl.
*H04B 7/00* (2006.01)
*H04B 1/06* (2006.01)

(52) U.S. Cl. .................. 455/41.2; 455/41.3; 455/269

(58) Field of Classification Search ............... 455/41.1, 455/41.2, 41.3, 269, 274, 286, 355; 343/866, 343/867, 868
See application file for complete search history.

(56) References Cited

U.S. PATENT DOCUMENTS 7,307,595 B2 * 12/2007 Schantz et al. ............... 343/718
7,565,107 B2 * 7/2009 Komatsuzaki et al. ...... 455/41.1

* cited by examiner

*Primary Examiner* — Eugene Yun
(74) *Attorney, Agent, or Firm* — Peter J. Van Bergen; James J. McGroary

(57) ABSTRACT

A short-range communication system includes an antenna, a transmitter, and a receiver. The antenna is an electrical conductor formed as a planar coil with rings thereof being uniformly spaced. The transmitter is spaced apart from the plane of the coil by a gap. An amplitude-modulated and asynchronous signal indicative of a data stream of known peak amplitude is transmitted into the gap. The receiver detects the coil's resonance and decodes same to recover the data stream.

17 Claims, 2 Drawing Sheets

SHORT-RANGE COMMUNICATION SYSTEM

ORIGIN OF THE INVENTION

The invention described herein was made by employees of the United States Government and may be manufactured and used by or for the Government of the United States for governmental purposes without the payment of any royalties thereon or therefore.

BACKGROUND OF THE INVENTION

1. Field of the Invention

This invention relates to wireless communication systems. More specifically, the invention is short-range communication for simultaneous gap sensing and wireless data transfer.

2. Description of the Related Art

Small gap sensing is utilized in a variety of robotic applications. Ideally, a gap is sensed by some type of non-contact apparatus using optical sensing, acoustic sensing, magnetic field sensing, etc. These devices and/or systems are single-function devices/system generally only capable of determining proximity between a "transmitter" and a "receiver" that are spaced-apart from one another. While such single-function devices/systems work, multi-function devices/systems are preferred for cost effectiveness and improved overall system operation.

SUMMARY OF THE INVENTION

Accordingly, it is an object of the present invention to provide a multi-function, short range communication system for sensing a gap and transmitting information across the gap.

Other objects and advantages of the present invention will become more obvious hereinafter in the specification and drawings.

In accordance with the present invention, a short-range communication system includes an antenna defined by an electrical conductor arranged in a plane. The conductor is formed as a coil with rings thereof being uniformly spaced. The system also includes a transmitter spaced apart from the plane of the coil by a gap. The transmitter is used to transmit an electromagnetic wave towards the coil. The wave is based on an amplitude-modulated and asynchronous signal indicative of a data stream of known peak amplitude. The system also includes a receiver coupled to the coil. The receiver detects the coil's resonance and decodes same to recover the data stream.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
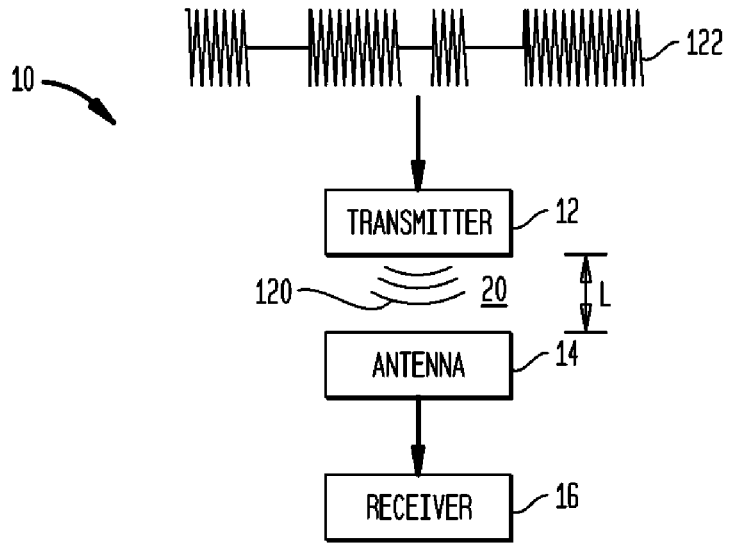
FIG. 1 is a top-level block diagram of a short-range communication system in accordance with the present invention.

Referring now to the drawings and more particularly to FIG. 1, a top-level block diagram of a short-range communication system in accordance with the present invention is shown and is referenced generally by numeral 10. As will be apparent from the following description, system 10 can be realized by a variety of constructions without departing from the scope of the present invention. Accordingly, it is to be understood that the specific embodiments described herein are not limitations of the present invention's novelty.

Short-range communication system 10 includes a transmitter 12, an antenna 14 and a receiver 16. The general attributes of these three elements will be described to provide an overview of the present invention. Transmitter 12 is any one or more components capable of transmitting an amplitude-modulated asynchronous signal in the form of an electromagnetic wave 120 across a gap region 20 defined between transmitter 12 and antenna 14. In general, the waveform that defines wave 120 is indicative of data that is to be communicated to receiver 16. An example of such a waveform is referenced by numeral 122. The length of gap region 20 is referenced by "L" in FIG. 1. While the particular length L is not a limitation of the present invention, typical values for L in many robotic applications range between approximately 5-500 micrometers.

Antenna 14 is a coil-type of antenna that lies in a plane opposing transmitter 12. When exposed to wave 120, antenna 14 is excited to resonance in correspondence with waveform 122 that defines wave 120. As will be explained further below, the amplitude of the resonance is indicative of changes in length L.

Receiver 16 is any one or more components capable of detecting and decoding the resonance of antenna 14. The goal of receiver 16 is two-fold. First, receiver 16 uses the peak amplitude of the resonance to determine if gap length L has changed. Second, receiver 16 converts the resonance of antenna 14 to a signal that is the same as waveform 122 used to define wave 120. Thus, communication system 10 simultaneously performs a gap sensing function and a data communication function.

Figure 2:
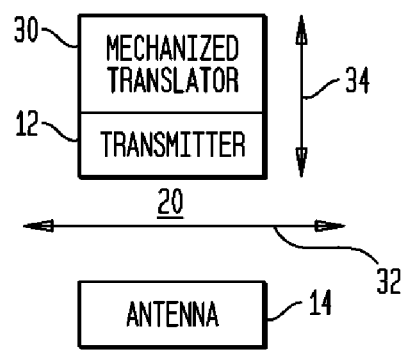
FIG. 2 is a diagram of a mobile transmitter in accordance with an embodiment of the present invention.

By performing a gap sensing function, the present invention is well suited for use in mobile systems where a gap (between two structures experiencing relative movement) can undergo intentional and/or unintentional changes. For example, a system configured to undergo intentional changes in gap region 20 is shown in FIG. 2 where transmitter 12 is coupled to a mechanized translator 30 that can move transmitter 12 laterally with respect to antenna 14 as indicated by two-headed arrow 32 and/or towards/away from antenna 14 as indicated by two-headed arrow 34. Unintentional changes in gap region 20 could be caused by vibrations or temperature changes occurring in the environment supporting or surrounding the communication system of the present invention.

Figure 3:
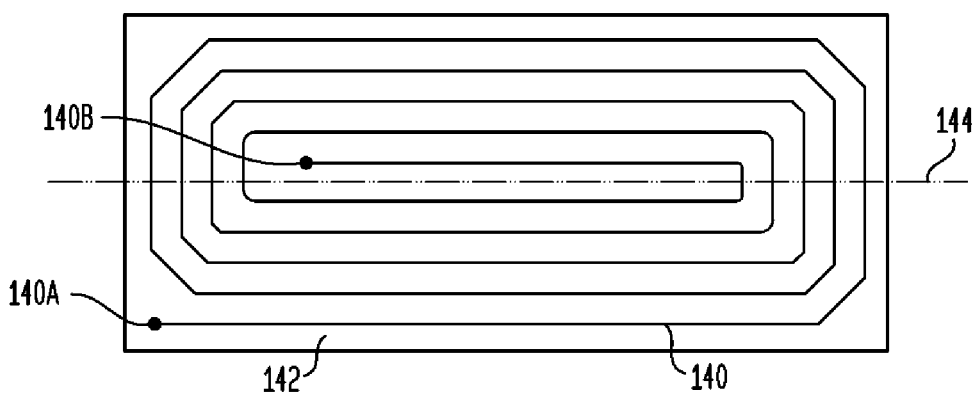
FIG. 3 is a plan view of a coil antenna in accordance with an embodiment of the present invention.

As mentioned above, antenna 14 is a coil-type of antenna where the coil is formed in a plane. One example of such an antenna is shown in FIG. 3 where an electrical conductor 140 is arranged to form a single planar coil having multiple rings formed between the conductor's ends 140A and 140B as shown. In this embodiment, conductor 140 is mounted on a non-electrically conductive substrate 142. For example, substrate 142 can be a conventional printed wiring board substrate with conductor 140 being a conductive run "printed" thereon as would be well understood in the art. However, it is to be understood that antenna 14 could be constructed in a variety of other ways (e.g., made on a silicon die for MEMS applications) without departing from the scope of the present invention.

Regardless of the particular construction of conductor 140/substrate 142, conductor 140 is arranged to define uniformly-spaced rings with portions of the rings being parallel to one another and to a planar axis 144 of the coiled arrangement of conductor 140. In terms of gap sensing, this antenna embodiment will be sensitive to gap changes anywhere along axis 144. Accordingly, this type of antenna design is well-suited for applications that permit or provide for relative movement between the system's transmitter and antenna along axis 144.

Figure 4:
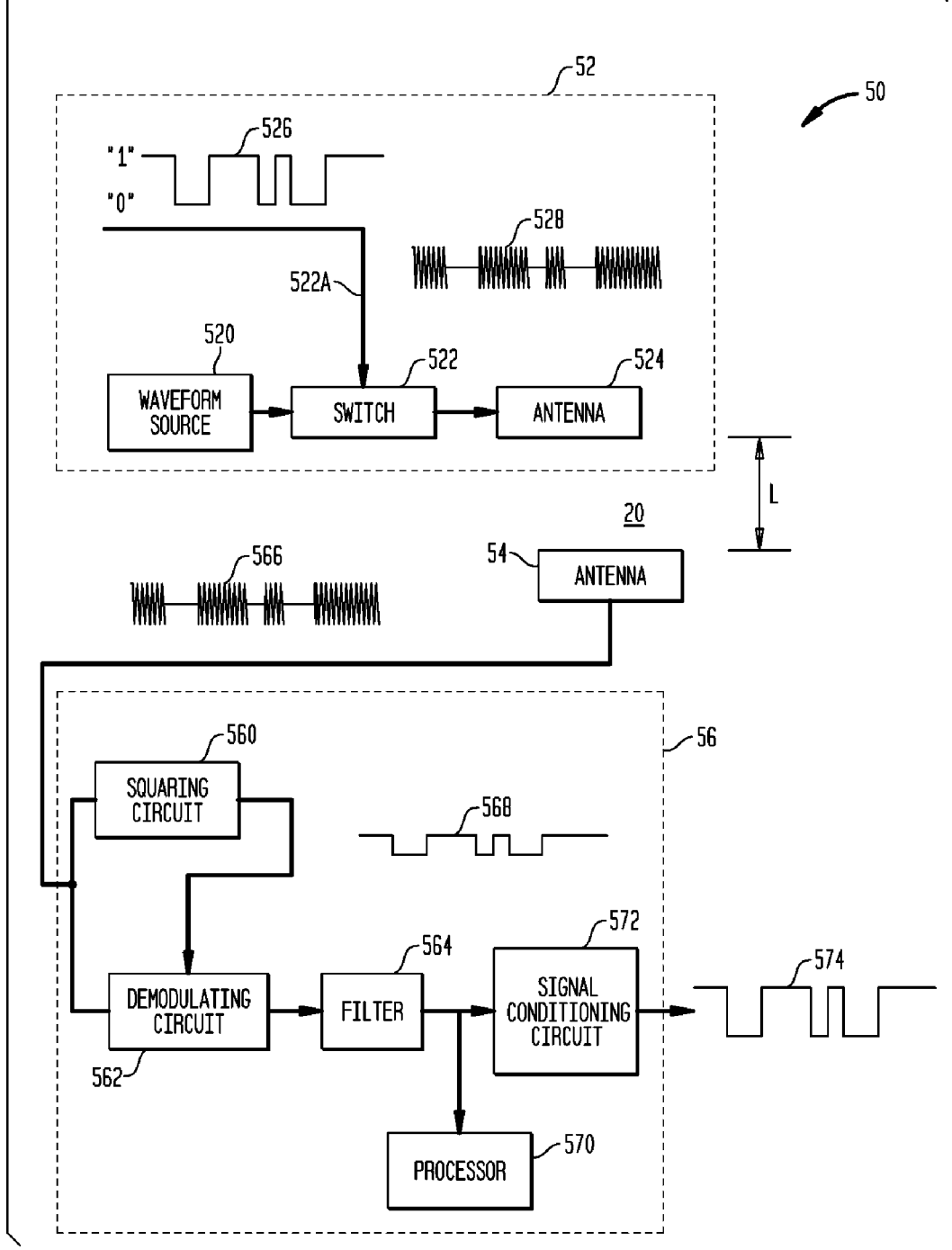
FIG. 4 is a schematic view of a multi-function, short-range communication system in accordance with an embodiment of the present invention.

A more detailed example of a multi-function, short-range communication system in accordance with the present invention is shown in FIG. 4 and is referenced by numeral 50.

Similar to system 10, communication system 50 includes a transmitter 52, an antenna 54, and a receiver 56. Transmitter 52 has an alternating current (AC) excitation waveform source 520 that generates a carrier frequency signal. The particular frequency of the generated signal is not a limitation of the present invention. The carrier signal generated by source 520 is passed through a switch 522 before being applied to a transmission antenna 524 (e.g., a non-shielded, coil inductor). Switch 522 can be an on/off type switch that passes/inhibits the signal from source 520 based on an on/off control signal applied thereto at 522A. In the present invention, control signal 522A is a serial digital data stream (e.g., data stream 526) indicative of data that is to be communicated across gap region 20. Data stream 526 can originate within transmitter 52 or can be supplied thereto from an external source (not shown) without departing from the scope of the present invention. Switch 522 uses the carrier signal from source 20 and data stream 526 to output an amplitude modulated asynchronous signal indicated by numeral 528. Signal 528 has known peak amplitude "A" that is provided to receiver 56 or known 'a priori' by receiver 56. Signal 528 is applied to antenna 524 where an electromagnetic wave indicative thereof is transmitted into gap region 20.

Antenna 54 is disposed on the other side of gap region 20 and can be configured as described above. For example, antenna 54 could be constructed as shown in FIG. 3 in which case transmitter 52 and/or antenna 54 can be coupled to a device(s) that causes relative movement therebetween on either side of gap region 20.

Receiver 56 is coupled to antenna 54 in order to detect the resonance thereof caused by the electromagnetic wave output of antenna 524. As mentioned above, receiver 56 decodes the detected resonance to sense changes in gap region 20 and reconstruct data stream 526 being communicated to receiver 56. While these functions can be achieved by a variety of electronics methods, a simple approach is illustrated by way of example. The basic goal of the decoding function is to remove the carrier frequency from the resonance signal generated by antenna 524. In the illustrated embodiment, this is achieved by the combination of a squaring circuit 560, a demodulating circuit 562, and a filter 564 (e.g., a low pass filter when the carrier frequency is high relative to the frequency of data stream 526).

Squaring circuit 560 and demodulating circuit 562 each receive the detected resonance signal 566 from antenna 54. Resonance signal 566 will be of the form of signal 528 but with reduced peak amplitude "B" where B is less than A and is in proportion to the length L of gap region 20. Squaring circuit 560 generates a squared version of resonance signal 566 that is supplied to demodulating circuit 562. The resulting output of demodulating circuit 562 is applied to filter 564 where the carrier frequency (associated with the carrier signal generated by source 520) is removed. The output of filter 564 is a demodulated data stream 568 that resembles data stream 526 except that the peak amplitude of data stream 568 is affected by gap region 20. Accordingly, a processor 570 (or other monitoring circuit) can be used to monitor the peak amplitude of data stream 568 and compare same to the peak amplitude A of signal 528 (e.g., known 'a priori' or provided to processor 570). Changes in the peak amplitude of data stream 568 are indicative of changes in length L of gap region 20. Thus, processor 570 completes the gap sensing function of communication system 50.

The final signal reconstruction step is performed by a signal conditioning circuit 572 that restores the amplitude of data stream 568 to acceptable transisitor-transistor logic (TTL) levels. For example, signal conditioning circuit 572 could increase the peak amplitude of data stream 568 to that of data stream 526. In such a case, the resulting output of circuit 572 (i.e., data stream 574) is identical to data stream 526 to complete the data communication function of communication system 50.

The advantages of the present invention are numerous. Gap sensing and data communication are performed simultaneously by the same system in a non-contact fashion. The antenna used to receive an airborne data transmission can be readily designed for relative movement with respect to the system's transmitter. Thus, the present invention will be particularly useful in a variety of robotic systems where small gaps must be sensed and/or maintained between two devices, and where data needs to be communicated between the two devices when such gaps exist.

Although the invention has been described relative to a specific embodiment thereof, there are numerous variations and modifications that will be readily apparent to those skilled in the art in light of the above teachings. For example, the system's transmitter could also be configured to receive transmissions in which case the communication system could provide bi-directional communication. In addition, the present invention is not limited to single-transmitter/single-receiver system described herein. For example, a master/slave (or half-duplex) system could also be constructed based on the principles described herein without departing from the scope of the present invention. It is therefore to be understood that, within the scope of the appended claims, the invention may be practiced other than as specifically described.

What is claimed as new and desired to be secured by Letters Patent of the United States is:

1. A short-range communication system, comprising:
   an antenna defined by an electrical conductor arranged in a plane, said conductor forming a coil with rings thereof being uniformly spaced;
   a transmitter spaced apart from said plane of said coil by a gap, said transmitter transmitting an electromagnetic wave towards said coil, said wave being an amplitude-modulated and asynchronous signal indicative of a data stream of known peak amplitude wherein said coil is excited to resonance in correspondence with said amplitude-modulated and asynchronous signal; and
   a receiver coupled to said coil for detecting said resonance and an actual peak amplitude associated therewith wherein said actual peak amplitude is indicative of the magnitude of said gap, said receiver further decoding said resonance to recover said data stream.

2. A short-range communication system as in claim 1, further comprising a non-conductive planar substrate, said conductor being mounted on said substrate.

3. A short-range communication system as in claim 2, wherein said conductor is printed on said substrate.

4. A short-range communication system as in claim 1, wherein said transmitter comprises:
- a signal source for generating an alternating current (AC) signal; and
- means, coupled to said signal source and adapted to be coupled to a digital source generating said data stream, for using said AC signal and said data stream to transmit said wave into said gap.

5. A short-range communication system as in claim 4, wherein said means includes a switch for permitting said AC signal to be transmitted into said gap only when said data stream defines a digital "1".

6. A short-range communication system as in claim 1, wherein said receiver comprises:
- a demodulator electrically coupled across said coil for generating a digital signal from said resonance, said digital signal defined by said actual peak amplitude; and
- a signal conditioner coupled to said demodulator for increasing said actual peak amplitude of said digital signal.

7. A short-range communication system as in claim 1, further comprising means coupled to at least one of said antenna and said transmitter for causing relative movement therebetween.

8. A short-range communication system, comprising:
- an antenna defined by an electrical conductor having a first end and a second end, said conductor formed in a plane as a coil with portions of said coil being uniformly spaced and parallel along an axis of said plane;
- a transmitter spaced apart from said plane of said coil by a gap, said transmitter transmitting an electromagnetic wave towards said coil, said wave being an amplitude-modulated and asynchronous signal indicative of a data stream of known peak amplitude wherein said coil is excited to resonance in correspondence with said amplitude-modulated and asynchronous signal, said transmitter further being adapted for movement in a direction aligned with said axis; and
- a receiver coupled to said first end and said second end of said coil for detecting said resonance and an actual peak amplitude associated therewith wherein said actual peak amplitude is indicative of the magnitude of said gap, said receiver further decoding said resonance to recover said data stream.

9. A short-range communication system as in claim 8, further comprising a non-conductive planar substrate, said conductor being mounted on said substrate.

10. A short-range communication system as in claim 9, wherein said conductor is printed on said substrate.

11. A short-range communication system as in claim 8, wherein said transmitter comprises:
- a signal source for generating an alternating current (AC) signal; and
- an on/off switch coupled to said signal source and adapted to have its on/off operation controlled by a digital source generating said data stream wherein said AC signal is converted to said wave for transmission into said gap.

12. A short-range communication system as in claim 8, wherein said receiver comprises:
- a demodulator electrically coupled across said coil for generating a digital signal from said resonance, said digital signal defined by said actual peak amplitude; and
- a signal conditioner coupled to said demodulator for increasing said actual peak amplitude to said known peak amplitude of said data stream.

13. A short-range communication system, comprising:
- an antenna defined by an electrical conductor having a first end and a second end, said conductor formed in a plane as a coil with portions of said coil being uniformly spaced and parallel along an axis of said plane;
- a transmitter spaced apart from said plane of said coil by a gap, said transmitter transmitting an electromagnetic wave towards said coil, said wave being an amplitude-modulated and asynchronous signal indicative of a data stream of known peak amplitude wherein said coil is excited to resonance in correspondence with said amplitude-modulated and asynchronous signal;
- means coupled to said transmitter for moving said transmitter in a direction aligned with said axis; and
- a receiver coupled to said first end and said second end of said coil for detecting said resonance and an actual peak amplitude associated therewith wherein said actual peak amplitude is indicative of the magnitude of said gap, said receiver further decoding said resonance to recover said data stream.

14. A short-range communication system as in claim 13, further comprising a non-conductive planar substrate, said conductor being mounted on said substrate.

15. A short-range communication system as in claim 14, wherein said conductor is printed on said substrate.

16. A short-range communication system as in claim 13, wherein said transmitter comprises:
- a signal source for generating an alternating current (AC) signal; and
- an on/off switch coupled to said signal source and adapted to have its on/off operation controlled by a digital source generating said data stream wherein said AC signal is converted to said wave for transmission into said gap.

17. A short-range communication system as in claim 13, wherein said receiver comprises:
- a demodulator electrically coupled across said coil for generating a digital signal from said resonance, said digital signal peak amplitude; and
- a signal conditioner coupled to said demodulator for increasing said actual peak amplitude to said known peak amplitude of said data stream.

* * * * *